Aug. 4, 1931.  J. F. SCHYLANDER  1,816,914
FASTENING DEVICE
Filed Oct. 6, 1928
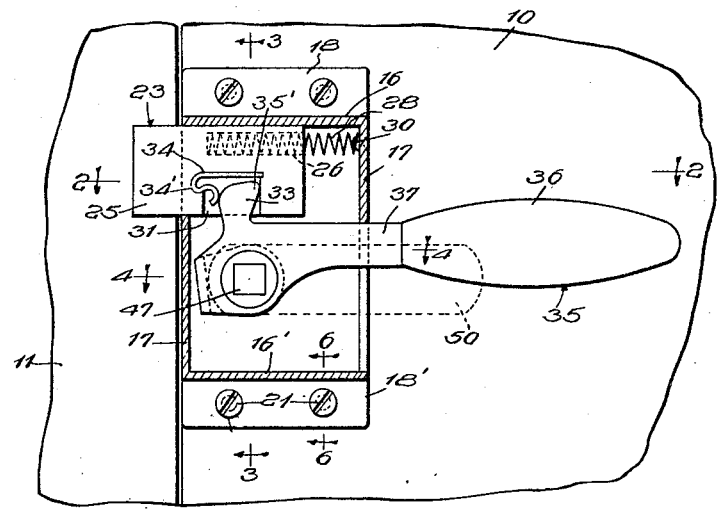
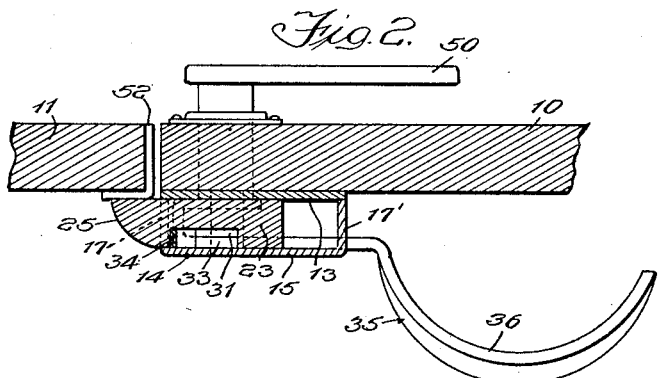
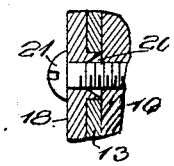
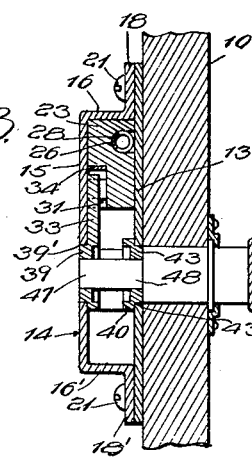
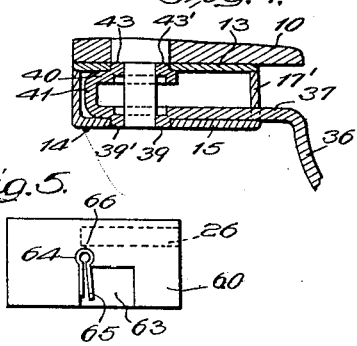
Witness:
William P. Kilroy
Inventor:
John F. Schylander
By Hill & Hill Patented Aug. 4, 1931

1,816,914

UNITED STATES PATENT OFFICE

JOHN F. SCHYLANDER, OF CHICAGO, ILLINOIS

FASTENING DEVICE

Application filed October 6, 1928. Serial No. 310,777.

My invention relates to fastening devices and has to do more particularly with locking devices especially adapted to be mounted on a door of an automobile or other vehicle.

An object of my invention is to provide a device of the class described which will be particularly simple in construction, inexpensive to manufacture, certain in operation, and rugged.

Another object of my invention is to produce an article of the class referred to which may be made largely from a small number of relatively simple and inexpensive parts.

Various other objects and advantages of the construction herein shown and described will be obvious to those skilled in the art from the disclosure herein given.

To this end my invention consists in the novel construction, arrangement and combination of parts herein shown and described, and more particularly pointed out in the claim.

Referring now to the drawings forming a part of this specification and illustrating a preferred embodiment of the invention:

Fig. 1 represents an elevational view, partly in section, of a device embodying my invention mounted on an automobile door, the door and cooperating body portion of the automobile being shown fragmentarily;

Fig. 2 is a sectional view taken on the line 2—2 of Fig. 1;

Fig. 3 is a sectional view taken on the line 3—3 of Fig. 1;

Fig. 4 is a sectional view taken on the line 4—4 of Fig. 1;

Fig. 5 is a detail view of the striker bolt showing a modified form of my invention; and Fig. 6 is a detail sectional view on an enlarged scale showing the method of forming the lock housing.

Devices embodying my invention may be made either right or left hand, as will be obvious to those skilled in the art. Hence, while only one form is shown, the other may be made by an obvious reversal of parts.

Referring first to Figs. 1 to 4 in the preferred embodiment disclosed, the numeral 10 indicates a door of an automobile or other vehicle cooperating with the body portion 11 of the vehicle. A plate 13 forming a part of the locking device is secured to a cooperating casing member 14. The casing member 14 is substantially rectangular, forming, in cooperation with the plate 13, a housing having the form of a rectangular parallelopiped. This casing member 14 comprises a wall 15 disposed in parallel relation to the plate 13, top and bottom walls 16 and 16' and side walls 17 and 17'. The top, bottom, and side walls are formed integrally with the wall 15. Outstanding flanges 18 and 18' are formed integrally with the top and bottom walls 16 and 16' and are adapted to be disposed against and parallel to the plate 13. The material of the flanges 18 and 18' is punched out (as shown in Fig. 6) to form annular members 20 which are swaged to apertures 21 in the plate 13, so as to form substantially a unitary container, these apertures and annular members serving as seats for screws 21 or other suitable means for securing the device to the door 10. If desired, solder may be placed between the edges of the casing and plate.

Slidably disposed within the container formed by the casing 14 and the plate 13 is a latch or striker bolt 23 having a curved beveled edge 25 as shown in Fig. 2. Except for the bevel above referred to, this bolt is substantially in the form of a rectangular parallelopiped and has a longitudinal cavity 26 formed on the face adjacent the plate 13. This cavity houses a helical spring 28, one end of this spring being secured to a boss 30 on the wall 17'.

On the side of the bolt 23 adjacent the wall 15 of the casing member 14 is a rectangular cavity 31 adapted to house a lug 33 of a manipulating member 35. The bolt is maintained firmly in contact with the lug 33 (Fig. 1) by means of a leaf spring 34 disposed in the cavity, this cavity being recessed as at 34' for firmly seating the spring. It will be noted that the lug 33 has a curved surface at 35', the point of contact between the lug and the wall 33' of the block, so as to reduce friction at this point.

The manipulating member 35 is in the form of a lever formed preferably of a single piece of metal or the like and comprises a curved handle portion 36 and an arm portion 37 having a circular boss 39 thereon disposed in a circular opening 39' of the wall 15, and an end portion 40 bent around as at 41 so that the end portion is substantially parallel to the arm portion 37. The end portion 40 has a circular boss 43 formed thereon which is substantially similar to and aligned with the boss 39 and is seated in an aperture 43' of the plate 13. Thus, the bosses 39 and 43 serve as bearings for the rotation of the handle 35. Aligned apertures 47 and 48 are formed in the bosses 39 and 43, these apertures being rectangular in the particular embodiment shown, for the mounting of a handle member 50 on the other side of the door 10.

In the assembling of my device, it will be obvious that the bolt 23 is assembled in the casing member 14 with the springs 28 and 34, and the manipulating member 35 is then placed with the boss 39 seated in the aperture 39', the lug 33 being disposed in the slot 31 and bearing against the spring 34. The plate 13 is then brought into place with the aperture 43' seating the boss 43 and the annular members 20 are then swaged into the apertures 21. The device is now in condition to be mounted on a door 10 and the handle 50 is secured on the opposite side thereof by suitable means.

An L-shaped plate 52 is secured to the edge of the wall 11 at the point where the latch 23 projects, so as to reinforce and protect the wall.

It will be readily seen that my device is extremely simple in construction and operation. Rotation of the handle in a clockwise direction results in moving the lug 33 to the right, thus moving the striker bolt 23 in the same direction against the action of the spring 28, and thus the bolt is moved out of engagement with the plate 52 and the door is free to be opened. The lug 33 is always maintained firmly in engagement with the wall of the cavity 31 by the spring 34, thus preventing any tendency of the bolt handle to rattle in any position, and the spring 28 tends to return the bolt to the position shown in Figs. 1 and 2. The spring 34 and lug 33 are so designed and positioned that the tension of the spring 34 remains the same, regardless of the position of the handle.

Fig. 5 shows a modification of the device above illustrated in which a slightly different form of spring is used for retaining the lug of the manipulating member in firm engagement with the bolt. In this case, the striker bolt 60 has a longitudinal aperture 26 similar to the aperture 26 in bolt 23 for housing a coil spring (not shown) and an aperture 63 with a curved recess 64 therein. A spring 65 shaped like a cotter pin has its curved head 66 disposed within the recess 64, this spring being adapted to function similarly to the spring 34. The aperture 63, of course, being adapted to seat the lug of a handle, as in the other embodiment.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

In a device of the class described, a housing, a handle rotatably mounted in said housing, a latch comprising an apertured bolt slidable in said housing, means integral with said handle and disposed in the aperture of said bolt for controlling said latch, said bolt having a recess in the aperture thereof, a leaf spring the shape of a cotter pin having its head secured in said recess for maintaining said bolt in engagement with said controlling means, and means for resiliently urging said bolt out of said housing.

In testimony whereof, I have hereunto signed my name.

JOHN F. SCHYLANDER.